Patented Nov. 13, 1945

2,388,881

UNITED STATES PATENT OFFICE 2,388,881

GELATIN COATING COMPOSITION

Donald R. Swan, Rochester, N. Y., assignor to Eastman Kodak Company, Rochester, N. Y., a corporation of New Jersey No Drawing. Application August 3, 1940, Serial No. 351,091

1 Claim. (Cl. 106—128)

This invention relates to a gelatin coating composition particularly adapted for photographic uses in which a small amount of methyl cellulose is mixed with the gelatin to improve the characteristics of the solution.

In the photographic art, gelatin compositions are widely used either as photosensitive emulsions, as over coatings or as backings for photographic film. In applying such compositions it is desirable that the formation of air bubbles in the composition be reduced to a minimum and that the coating spread uniformly over the surface being coated.

One object of my invention is to provide a gelatin coating composition in which the formation of air bubbles is minimized. Another object of my invention is to provide a gelatine coating composition having good spreading properties when applied to a surface to be coated. Other objects of my invention will appear herein.

I have found that if an amount of methyl cellulose up to 20% of the total solids is incorporated in an aqueous solution of gelatin that the formation of air bubbles therein is minimized, the spreading properties are enhanced and the setting time of the coating is considerably reduced.

My invention particularly includes compositions used in coating photographic film or film base in which a warm gelatin coating is applied to a surface. For instance if a warm gelatin overcoating is applied on to a wet, chilled photographic emulsion there is ordinarily a decided tendency to form air bubbles. With a gelatin composition as specified herein the formation of air bubbles does not occur in coating it with a warm gelatin solution.

In its broader aspects my invention comprises gelatin coating compositions composed of a solution of about 3–10% of gelatin in water plus methyl cellulose in an amount up to 20% (preferably 5–20%) based on the total weight of solids present. The methyl cellulose is of the water-soluble type and has a methoxyl content of 16–28%. This composition may be applied in warm condition directly upon a photosensitive emulsion. This composition spreads more readily than a gelatin solution of the same concentration and is therefore readily applied.

The coating composition is preferably made up at an elevated temperature such as 100–120° F. in view of the greater facility with which gelatin dissolves at an elevated temperature. The composition is kept at 90–120° F. for the coating operation so as to assure good fluidity. After applying to a surface, the coating layer is set by cooling preferably by subjecting it to a current of cold air. Although any current of air of room temperature or below may be useful, I have found that air having a temperature near to but above the freezing point of water (32° F.) is most desirable.

The viscosity of the methyl cellulose used in any composition may vary within wide limits. I have tried the methyl celluloses of the types designated commercially as low viscosity, medium viscosity, high viscosity and extra high viscosity, in my composition and all these types have been suitable. For instance four aqueous gelatin solutions of 7½% concentration were prepared and methyl cellulose at the rate of 15 gms. per pound of gelatin were incorporated in each, each receiving a different one of the viscosity types given above. A coating was made from each at a temperature of 95–100° F. The setting time of each was at most half that of a gelatin coating from a gelatin solution of the same concentration containing no methyl cellulose. The composition containing the extra-high viscosity methyl cellulose, exhibited the shortest setting time.

It is desirable in making up coating compositions in accordance with my invention that it be filtered before applying to a surface if the maximum clarity is desirable. This however is left to the discretion of the individual operator who may judge from the appearance of the coating composition whether or not filtering is necessary.

As pointed out above my coating composition may be employed as an overcoating for a photosensitive emulsion layer adhering to its support and may be applied before the emulsion has dried. It is also suitable for backings for photographic film and may be applied directly to the film base. If cellulose ester sheeting requires a gelatin coating for any purpose, my coating composition may be applied directly thereto and will exhibit good adherence. My composition is also useful as a carrier for the photosensitive element in photographic emulsions such as to carry the silver halide which is usually employed therein. Due to its improved spreading properties the coating of a gelatin photosensitive emulsion, containing methyl cellulose as specified, on to its support such as paper or cellulose ester film base is facilitated.

Where the clarity of the composition is important it is preferred to use an amount of methyl cellulose in the lower part of the range given. For instance, to obtain a coating of high transparency it is unnecessary and usually undesirable to use more than 0.5%–2% of the methyl cellulose (based on the weight of the gelatin). For ordinary purposes, however, the coating compositions specified herein are satisfactory in the transmittal of light therethrough.

I claim:

A coating composition for photographic purposes adapted to give coatings of high transparency, consisting of an aqueous solution of gelatin of 3–10% concentration, which solution sets at room temperature or less and as the modifying agent therein 0.5–2% (based on the weight of the gelatin) of methyl cellulose having a methoxyl content of 16–28%.

DONALD R. SWAN.